United States Patent [19]

Wampfler

[11] 4,221,282

[45] Sep. 9, 1980

[54] CONDUCTIVE SHOE ASSEMBLY FOR TROLLEY OR THE LIKE

[75] Inventor: Manfred Wampfler, Weil, Fed. Rep. of Germany

[73] Assignee: Wampfler GmbH, Weil am Rhein-Markt, Fed. Rep. of Germany

[21] Appl. No.: 908,883

[22] Filed: May 23, 1978

[30] Foreign Application Priority Data

Sep. 1, 1977 [DE] Fed. Rep. of Germany ....... 2739416

[51] Int. Cl.² ............................................. B60L 5/12
[52] U.S. Cl. ........................................ 191/68; 191/77
[58] Field of Search .............................. 191/68, 64–66, 191/69, 70, 88, 72, 73, 77

[56] References Cited

U.S. PATENT DOCUMENTS

| | | | |
|---|---|---|---|
| 396,618 | 1/1889 | Short | 191/70 X |
| 435,166 | 8/1890 | Atwood | 191/70 X |
| 496,631 | 5/1893 | Adams | 191/69 X |
| 500,070 | 6/1893 | Henry | 191/69 X |
| 525,789 | 9/1894 | Mahon et al. | 191/66 |
| 566,237 | 8/1896 | Short | 191/66 X |
| 1,692,893 | 11/1928 | Gutzat | 191/70 X |
| 2,512,329 | 6/1950 | Heinemann et al. | 191/66 X |

FOREIGN PATENT DOCUMENTS 1119903 3/1961 Fed. Rep. of Germany ............. 191/68

OTHER PUBLICATIONS

Dixon, D. L., *Carbon for Current Collection*, in *The Railway Gazette*, 12-1-1967, pp. 894–898.

*Primary Examiner*—Stephen G. Kunin
*Assistant Examiner*—Edmond G. Rishell, Jr.
*Attorney, Agent, or Firm*—Pollock, Vande Sande & Priddy

[57] ABSTRACT

An assembly for attaching a conductive shoe to a trolley or like vehicle, wherein a pair of elastic rods function to bias the conductive shoe into gliding, electrical contact with a conducting rail in spite of changing distances therebetween, with the elastic rods also providing electrical insulation between the conductive shoe and the trolley, effectively reducing the overall weight of the shoe.

12 Claims, 3 Drawing Figures

CONDUCTIVE SHOE ASSEMBLY FOR TROLLEY OR THE LIKE

BACKGROUND OF THE PRESENT INVENTION

The present invention relates to a novel structure for resiliently biasing the conductive shoe of a trolley or like vehicle into gliding contact with a current conducting rail assembly in order to provide operating power to the trolley.

Trolleys running on a pair of tracks usually receive power from an electrically charged, conducting rail extending parallel thereto. Furthermore, trolleys usually include some type of conductive shoe assembly which is biased into gliding contact with the conducting rail. A problem arises when the distance between the trolley and the conducting rail varies, which may result during movement or abrupt stop and start motions of the trolley. To ensure that the shoe remains in contact with the conducting rail as the distance changes therebetween, prior art devices have employed an independent spring assembly to bias the shoe into gliding contact with the rail.

For example, a known assembly uses a rhomboid linkage system between the trolley and the shoe, with two parallel rods being attached to the shoe by means of swivel joints. A separate spring stretched between the shoe and the trolley extends diagonally across the parallel rods, with the spring functioning to bias a shoe skid into contact with the conducting rail. This assembly has proven less than adequate for several reasons. The relatively large number of separate joints required for the assembly makes it difficult to properly guide the shoe along the conducting rail during movement of the trolley. The excessive number of parts, including the separate spring, are relatively complicated to assemble and costly to manufacture. Finally, the electrical insulation required between the skid and the trolley is especially costly because all of the insulation must be arranged within the conductive shoe. This also acts to increase the overall weight of the shoe causing possible inadvertent separation from the conducting rail.

As will be discussed in detail hereafter, applicant's new and useful device solves the problems confronting the prior art, by providing an inexpensive assembly for resiliently biasing a light-weight conductive shoe into engagement with an electrically charged rail, with the biasing members also providing electrical insulation between the shoe and trolley.

OBJECTS OF THE PRESENT INVENTION

An object of the present invention is to provide a novel assembly for resiliently biasing a conductive shoe into gliding contact with an electrically charged, conducting rail.

A further object of the present invention is to provide an assembly for supporting a conductive shoe by a pair of biasing rods formed of resilient material.

Another object of the present invention is to provide an assembly for progressively resisting separating movements of the conductive shoe.

A yet further object of the present invention is to provide an assembly which is both simple to construct and inexpensive to manufacture.

These and other objects of the present invention will become apparent from a reading of the following specification and claims, together with the accompanying drawings, wherein similar elements are referred to and are indicated by similar reference numerals.

BRIEF DESCRIPTION OF THE DRAWINGS

The present invention can be best understood with reference to the accompanying drawings, wherein.

DETAILED DESCRIPTION OF A PREFERRED EMBODIMENT

Figure 1:
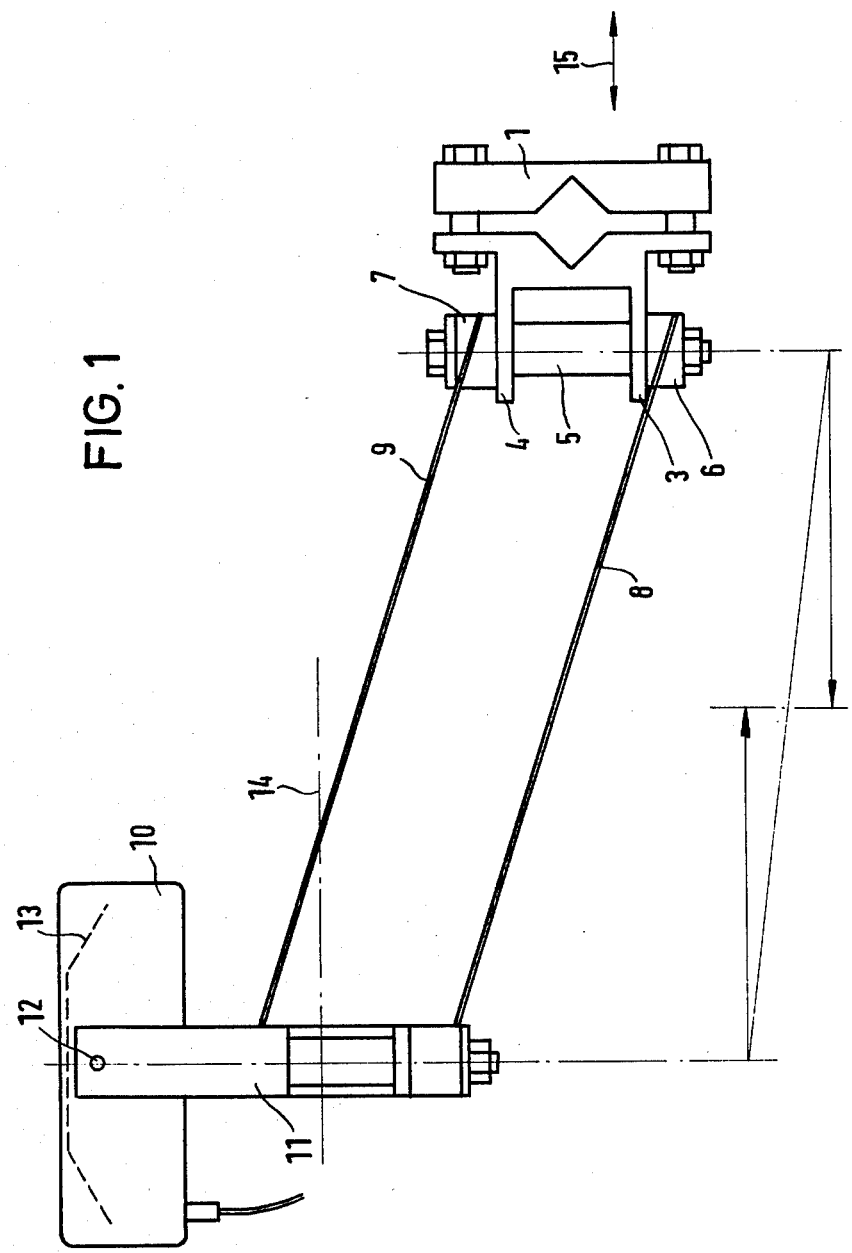
FIG. 1 shows a side view of an assembly according to a preferred embodiment, which is adaptable for attachment to a trolley and also adaptable for providing gliding, electrical contact with a conducting rail.

A preferred embodiment of the present invention will be described with reference to FIG. 1, wherein a support assembly 1 is removably attached to a trolley or like vehicle (not shown) by a plurality of conventional bolt assemblies. Support assembly 1 forms a pair of locking flanges, with one of the flanges including a pair of spaced arms indicated at 3 and 4, respectively.

Arms 3, 4 include aligned apertures, with a swing bolt 5 extending therethrough. A pair of clamping assemblies 6 and 7 are positioned on either end of swing bolt 5, with each clamping assembly including a diagonally extending cut section as shown in FIG. 1.

A support rod 8 is clamped within the cut formed in clamping assembly 6, while a similar support rod 9 is clamped within the cut formed in clamping assembly 7, with each of the support rods 8 and 9 being formed of a springy elastic material capable of providing good electrical insulation. For example, rods 8 and 9 may be formed of a glassfiber-reinforced epoxide resin with a glass content in excess of 70%. Rods 8 and 9 may take the form of relatively thin leaf-springs with flat sides extending vertically to a plane formed by the rods.

The rods 8 and 9 function to bias a conductive shoe assembly 10 into electrical contact with a conducting rail (not shown), while also providing sufficient insulation between shoe 10 and support assembly 1. End portions of rods 8 and 9 are positioned within a pair of cut sections formed in swivel bracket 11, similar to the cut sections formed in clamping assemblies 6 and 7, respectively.

Conductive shoe 10 is pivotally attached to swivel bracket 11 along an axis indicated at 12 by a conventional pin-type fastener. Shoe 10 encloses a skid 13, preferably in the form of a carbon brush, which makes actual contact with the conducting rail (not shown).

FIG. 1 depicts shoe 10 in a upward-pointing position, disengaged from the conducting rail, whose track is denoted by the line 14. In order to engage shoe 10 with the rail, the shoe is pushed downwardly into contact with the rail, deforming elastic rods 8 and 9. The deformed rods function as leaf-springs to bias skid 13 into contact with the rail while compensating for changes in distance between support assembly 1 and the line contact 14. It is important to note that rods 8 and 9 also provide the necessary insulation between shoe 10 and support assembly 1 without unnecessarily increasing the weight of shoe 10 with separate insulation. A further, additional resilient member 23 is attached to said shoe and said support assembly, with said additional resilient member extending diagonally with respect to said resilient members 8 and 9.

Swivel bracket 11 is axially guided in a direction parallel to the moving trolley, due to the rhomboid linkage arrangement of rods 8 and 9. The pivotal motion of swing bolt 5 within spaced arms 3 and 4 and the pivotal bearing 12 of shoe 10 in relation to the bracket 11 allow shoe 10 to glide along track 14, in spite of deviations of either track 14 or the path of the trolley as shown at 15, which may be due to changing passenger load or abrupt stops and starts of the trolley.

When a trolley moves horizontally, the dead-weight of conductive shoe 10 tends to deform rods 8 and 9 in a downwardly direction causing the rods to rotate attached swing bolt 5, resulting in eventual separation of shoe 10 from track 14. An alternative embodiment of applicant's invention provides a novel spring structure for overcoming this problem, as well as the problem of bolt 5 being rotated by the general operation of the trolley.

Figure 2:
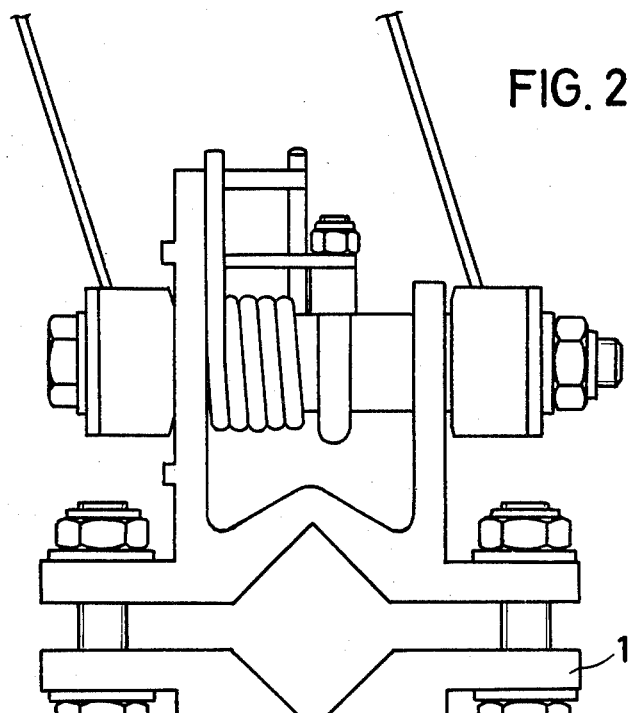
FIG. 2 shows a partial side view of an alternative embodiment of the present invention.

Turning to FIG. 2, a support assembly 1 is attached to dual rod assemblies, only one assembly being numbered. Arm 4 is provided with an arm 16 extending substantially parallel to swing bolt 5. A spring 17 of voluted-shape encircles bolt 5, with an end 18' of spring 17 pressing against one side of arm 16 and a further end 18" of spring 17 pressing against an opposite side of arm 16.

A bolt 19 extends at a right angle from bolt 5 in a direction generally parallel to arm 4. A further arm 20 attached to bolt 19 extends substantially parallel to arm 16. Arm 20 is positioned to extend between ends 18' and 18" of spring 17.

During operation, specific movement of rods 8 and 9 causing a clockwise rotation of bolt 5 (as seen from the left in FIG. 2) is resisted by spring 17 as a result of contact between arm 20 and end 18". In a similar manner, counter clockwise rotation of bolt 5 is resisted by spring 17 as a result of contact between arm 20 and end 18'. Increased rotation of bolt 5 in either direction, due to up and down movement of shoe 10, is resisted by a progressively increasing resistance of spring 17 as a direct result of the contact between arm 20 and either end 18' or 18". The progressively increasing resistance of spring 17 ensures a sufficiently powerful force for maintaining shoe 10 in contact with the conducting rail. It is considered within the scope of the present invention to employ the restoring spring 17 of FIG. 2 with a single pair of elastic rods as shown in FIG. 1.

Figure 3:
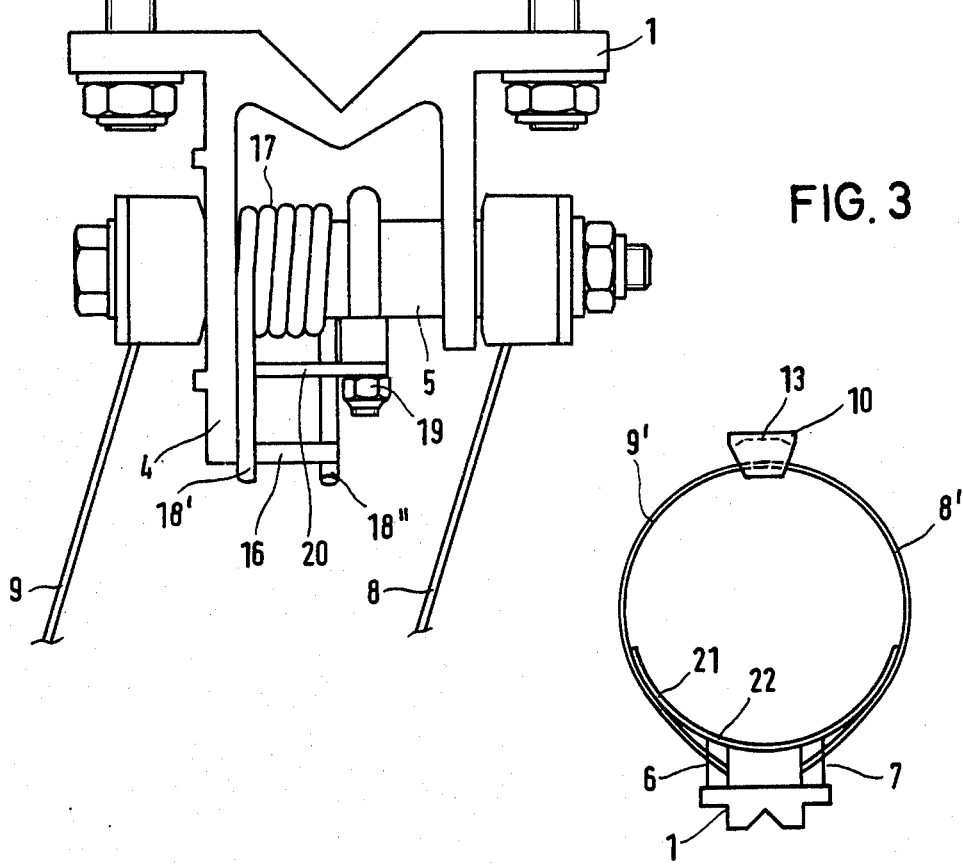
FIG. 3 shows a side view of a yet further embodiment of the present invention.

A further embodiment is shown in FIG. 3, wherein a pair of curved rods 8' and 9' form an arch-like shape when extending between support assembly 1 and shoe 10, respectively. It would be, of course, possible to form rods 8' and 9' as a single rod, attached at opposite ends thereof to clamping assemblies 6 and 7. Additional, curved rods 21 and 22 are positioned adjacent to and within the arch formed by rods 9' and 8', respectively, with rods 21 and 22 providing restoring spring forces for resisting deformation of rods 8' and 9'. As a result, the force acting at shoe 10 remains uneffected by forces acting on shoe 10.

The present invention is not to be limited to the above-described embodiments, but is to be limited only by the scope of the following claims.

What is claimed is:

1. A unique assembly for maintaining a conductive shoe assembly in contact with a current conducting rail to provide electrical power to an attached trolley-like vehicle traveling along a track extending substantially parallel to said rail, and comprising:

said conductive shoe assembly including a skid member adaptable for gliding contact with said conducting rail;

a support assembly releasably attachable to said trolley-like vehicle;

said support assembly comprising a pair of locking flanges attached to said trolley-like vehicle by a plurality of fasteners extending between said flanges, at least one of said locking flanges including a pair of support arms extending substantially parallel to one another, with a pair of aligned apertures formed in said pair of support arms and a rotatable bolt extending through said aligned apertures; and means support on said rotatable bolt and extending into engagement with said conductive shoe assembly for resiliently biasing said skid into gliding contact with said conducting rail while preventing electrical current from traveling through said means from said conductive shoe assembly to said support assembly.

2. An assembly according to claim 1, wherein said conductive shoe assembly includes a conductive shoe surrounding a portion of said skid member, with a slot in said conductive shoe aligned with said skid member to allow said skid member to contact said conducting rail.

3. An assembly according to claim 2, wherein said skid member comprises a carbon brush for making electrical contact with said conducting rail.

4. An assembly according to claim 2, wherein said conductive shoe assembly includes a bracket pivotally attached to said conductive shoe, with said biasing means attached to said bracket.

5. An assembly according to claim 1, wherein a pair of clamping members are attached to either end of said rotatable bolt, with said biasing means attached to at least one of said clamping members for joint rotation with said bolt.

6. An assembly according to claim 1, wherein a volute-shaped spring member surrounds said bolt, with opposite end portions of said spring positioned on either side of an arm extending from one of said support arms, and said spring ends also positioned on opposite sides of a further arm connected to said bolt, whereby:

rotation of said bolt in a first direction is progressively resisted by contact between a first end of said spring and said further arm and rotation of said bolt in a second opposite direction is progressively resisted by contact between a second end of said spring and said further arm.

7. An assembly according to claim 1, wherein said biasing means comprises at least one resilient member having a thin, flat profile extending between said conductive shoe assembly and said support assembly, wherein said at least one resilient member is formed of glassfiber-reinforced epoxy resin to prevent electrical current from flowing through said biasing means.

8. An assembly according to claim 5, wherein said biasing means comprises a pair of band-shaped, resilient members fixedly positioned within angularly cut sections formed in each of said clamping arms.

9. A unique assembly for maintaining a conductive shoe assembly in electrical contact with a current conducting rail to provide electrical power to a trolley-like vehicle attached to said conductive shoe assembly, and comprising:

said conductive shoe assembly including a skid member adaptable for gliding contact with said conducting rail;

a support assembly releasably attachable to said trolley-like vehicle;

biasing means extending between said conductive shoe assembly and said support assembly for resiliently biasing said skid into gliding contact with said conducting rail;

said biasing means comprising a pair of resilient members extending parallel to one another and forming a rhomboid linkage system, with each member formed of glassfiber-reinforced epoxy resin to insulate said support assembly against the flow of electrical current from said conductive shoe assembly.

10. An assembly according to claim 9, wherein said resilient members are each formed with a thin, flat profile to function as leaf-springs for biasing said conductive shoe assembly into contact with said conducting rail.

11. An assembly according to claim 9, wherein an additional resilient member is attached to said shoe and said support assembly, with said additional resilient member extending diagonally with respect to said pair of spaced resilient members.

12. An assembly according to claim 9, wherein said support assembly includes a pair of locking flanges attached to said trolley-like vehicle via a plurality of fasteners, with a pair of support arms extending from at least one of said locking flanges said support arms including aligned apertures for supporting a rotatable bolt extending therethrough, and a pair of clamping arms attached to either end of said rotatable bolt.

* * * * *